US009695647B2

(12) United States Patent
Bassinger et al.

(10) Patent No.: US 9,695,647 B2
(45) Date of Patent: Jul. 4, 2017

(54) DOWNHOLE TOOL RETAINER AND GUIDE RING

(71) Applicants: Varel International Ind., L.P., Carrollton, TX (US); Ross Bassinger, Austin, TX (US)

(72) Inventors: Ross Bassinger, Austin, TX (US); Grey Bassinger, Georgetown, TX (US); William W. King, Houston, TX (US)

(73) Assignee: VAREL INTERNATIONAL IND., L.P., Carrollton, TX (US)

( * ) Notice: Subject to any disclaimer, the term of this patent is extended or adjusted under 35 U.S.C. 154(b) by 0 days.

(21) Appl. No.: 14/681,401

(22) Filed: Apr. 8, 2015

(65) Prior Publication Data
US 2015/0218892 A1 Aug. 6, 2015

Related U.S. Application Data

(62) Division of application No. 13/693,663, filed on Dec. 4, 2012.
(Continued)

(51) Int. Cl.
E21B 4/14 (2006.01)
E21B 17/02 (2006.01)
(Continued)

(52) U.S. Cl.
CPC ............ E21B 17/03 (2013.01); E21B 4/14 (2013.01); E21B 17/02 (2013.01); B23P 15/001 (2013.01);
(Continued)

(58) Field of Classification Search
CPC ...... E21B 17/03; E21B 17/02; E21B 17/0426; E21B 17/042; E21B 4/14; B23P 15/001;
(Continued)

(56) References Cited

U.S. PATENT DOCUMENTS 3,964,551 A * 6/1976 Bassinger .................. 173/73
4,054,180 A * 10/1977 Bassinger .................. 173/136
(Continued)

FOREIGN PATENT DOCUMENTS

CN 101967955 2/2011
CN 101967955 * 9/2011 ............ E21B 4/16

OTHER PUBLICATIONS

Copenheaver, Blaine R, International Search Report and Written Opinion of the International Searching Authority for PCT/US2012/067777 pp. 1-9.
(Continued)

Primary Examiner — David Bryant
Assistant Examiner — Bayan Salone

(57) ABSTRACT

A retainer and guide ring includes a first ring half and a second ring half that when placed adjacent to one another forms a complete ring. The retainer and guide ring also includes a kerf that is formed between ends of each of the first and second ring halves, which ranges from about zero inches to about 0.010 inches. In some exemplary embodiments, the retainer and guide ring is formed by obtaining two identical rings and making a cut along an edge of the diameter on each ring thereby forming a larger ring arc and a smaller ring arc for each of the rings. The two larger ring arcs are used to form the retainer and guide ring. In another exemplary embodiment, the retainer and guide ring is formed by obtaining a single ring and making a cut along the diameter.

15 Claims, 5 Drawing Sheets

Related U.S. Application Data

(60) Provisional application No. 61/570,771, filed on Dec. 14, 2011.

(51) Int. Cl.
  *E21B 17/03*  (2006.01)
  *E21B 17/04*  (2006.01)
  *B23P 15/00*  (2006.01)
  *E21B 17/042*  (2006.01)

(52) U.S. Cl.
  CPC ......... *B23P 15/003* (2013.01); *E21B 17/0426* (2013.01); *Y10T 29/49826* (2015.01); *Y10T 29/49995* (2015.01); *Y10T 29/49996* (2015.01); *Y10T 29/49998* (2015.01)

(58) Field of Classification Search
  CPC ............ B23P 15/003; Y10T 29/49826; Y10T 29/49995; Y10T 29/49996
  USPC .......................................... 29/557, 558, 428
  See application file for complete search history.

(56) References Cited

U.S. PATENT DOCUMENTS

| | | | | |
|---|---|---|---|---|
| 4,576,384 A * | 3/1986 | Azibert | ........................ | 277/370 |
| 4,580,793 A * | 4/1986 | Bronson | ........................ | 277/547 |
| 4,924,948 A * | 5/1990 | Chuang et al. | ................. | 173/211 |
| 5,390,749 A * | 2/1995 | Lyon | ............................. | 175/296 |
| 5,647,447 A * | 7/1997 | Jones | ............................ | 175/300 |
| 5,699,867 A * | 12/1997 | Jones | ............................ | 175/296 |
| 5,803,192 A * | 9/1998 | Holte | ............................ | 175/296 |
| RE36,002 E * | 12/1998 | Elsby et al. | .................. | 175/296 |
| 6,021,856 A * | 2/2000 | Pascale | ........................ | 175/414 |
| 6,257,792 B1 * | 7/2001 | Read, Jr. | ......................... | 403/16 |
| 6,533,749 B1 * | 3/2003 | Mitusina et al. | ................ | 604/22 |
| 7,117,939 B1 * | 10/2006 | Hawley et al. | ................. | 166/99 |
| 7,231,983 B2 * | 6/2007 | Lequang | ................ | E21B 33/038 |
| | | | | 166/368 |
| 7,343,989 B2 * | 3/2008 | Underwood | ................ | 175/325.2 |
| 7,377,338 B2 * | 5/2008 | Bassinger | ..................... | 175/296 |
| 7,665,548 B2 * | 2/2010 | Underwood | ................ | 175/325.2 |
| 8,061,716 B2 * | 11/2011 | Wirt | .............................. | 277/631 |
| 8,313,271 B2 * | 11/2012 | Smith | ........................... | 409/131 |
| 2008/0135298 A1 * | 6/2008 | Underwood | .................... | 175/57 |
| 2008/0185187 A1 * | 8/2008 | Scott et al. | .................... | 175/320 |
| 2009/0018689 A1 * | 1/2009 | Smith | ........................... | 700/114 |
| 2013/0153208 A1 * | 6/2013 | Bassinger et al. | ......... | 166/241.6 |

OTHER PUBLICATIONS

Strommen, Henrik, Extended European Search Report issued in EP Application No. 12856794.8, completed Aug. 26, 2015, 12 pages, European Patent Office, Munich, Germany.

\* cited by examiner

DOWNHOLE TOOL RETAINER AND GUIDE RING

CROSS REFERENCE TO RELATED APPLICATIONS

This patent application is a divisional of and claims priority under U.S.C. §120 to U.S. patent application Ser. No. 13/693,663, entitled "Downhole Tool Retainer And Guide Ring And Methods Of Fabricating The Same," filed Dec. 4, 2012; which claims priority under 35 U.S.C. §119 to U.S. Provisional Patent Application No. 61/570,771, entitled "Downhole Tool Retainer And Guide Ring" filed on Dec. 14, 2011, the entirety of both being incorporated by reference herein.

TECHNICAL FIELD

The present invention relates generally to downhole tools of a combined nature, that is having an upper casing component and a lower connected component capable of rotation, deflection, or axial movement. Tools of this description include downhole motors, downhole turbines, flexible connections, shock tools, jars, anti-stall tools, torque management tools, and clutch tools. More specifically, the invention relates to downhole hammers and percussion tools; and more particularly, to an apparatus for retaining a drill bit and/or other components within a drill casing during a failure and guiding the drill bit during drilling and to one or more methods of manufacturing the apparatus.

BACKGROUND

A common failure mode of downhole hammers, percussion tools, and other multi-component downhole tools involves fatigue breakage of the lower housing, or in the case of a tool connected to a drill bit, breakage of the bit, or the bit connection shank. This failure mode can result in loss of some or all of the lower tool components or in the case of a tool connected to a drill bit, the loss of the bit, the bit and shank, or alternatively, the bit, the shank, and the lower housing of the tool being left in the hole after the failure, thereby creating a need to fish these parts out of the hole. Various methods, including various configurations of split retainer rings, have been used in the past to prevent the complete loss of the components below the failure point so that the complete assembly, though broken, can be pulled from the hole. An example of a downhole percussion tool that is the subject of at least one exemplary embodiment of this invention is described and illustrated in U.S. Pat. No. 7,377,338, entitled "Downhole Percussion Tool," issued to Bassinger on May 27, 2008, which is incorporated by reference in its entirety herein.

An example of a prior art retaining ring is described and illustrated in U.S. Pat. No. 5,390,749, entitled "Apparatus for Positioning A Split Retaining Ring In A Down-Hole Percussive Drill," issued to Lyon on Feb. 21, 1995 ("Lyon"), which is incorporated by reference in its entirety herein. An alternative example of a prior art split retainer ring is described and illustrated in U.S. Reissued Pat. No. RE 36,002, entitled "Transmission Sleeve For A Down Hole Hammer," issued to Elsby et al. on Dec. 22, 1998 ("Elsby"), which also is incorporated by reference in its entirety herein. Another example of a prior art retaining ring is described and illustrated in U.S. Pat. No. 4,924,948, entitled "Shock Absorbing Bit Retaining Ring," issued to Chuang et al. on May 15, 1990 ("Chuang"), which also is incorporated by reference in its entirety herein.

According to Lyon, the problems inherent in prior art split rings are explained. Lyon states, "Down-hole drills typically use a set of split retaining ring halves to retain the drilling bit within the casing of the drill. These rings are usually flat and split so they can be axially sandwiched and retained between internal drill parts, i.e. the chuck and the bit bearing. Due to high levels of vibration and shock in the bit end of the down-hole drill, conventional split retaining rings are prone to move radially back and forth within a space provided by the split between the halves. Such movement of rings can cause a number of problems, namely: 1. rubbing of the rings against the bit causing the bit to crack; 2. incomplete contact between the ring halves and the bit contact shoulder; 3. damage to the contact zone on the bit; and 4. high stresses in the ring halves." See Lyon, col. 1, ll. 12-28 (emphasis added).

It is clear from Lyon's description that prior art rings are relatively loosely fitted into the space provided. Lyon describes how the rings of his invention are manufactured and states, "The separate ring halves are produced from one hollow, cylindrical body which is first tapered at the top and bottom, and thereafter diametrically cut into two pieces. The kerf of the cut represents the amount of arc distance that will be present between the ring halves, as assembled in a drill." See Lyon, col. 4, ll. 11-16 (emphasis added). Lyon's solution to the above problems is to taper the top and bottom of the split ring to match tapers in the top of the lower housing and in the bottom of the bit bearing to drive the split rings outward to the inner diameter of the tool outer case. Thus, although a kerf exists between the two ring halves, Lyon is attempting to reduce the radial back and forth movement of the rings by using tapers on the top and bottom surface of the rings and matching tapers on adjacent components. However, Lyons does not address the movement allowed by the "kerf of the cut." Additionally, the presence of the kerf reduces or eliminates the ability of the split ring to contribute stabilizing guidance to the traveling bit shank.

Uniformly within the prior art the expedient of saw cutting the split ring from a single turned ring (even with a highly tensioned, sharp and slowly applied mechanical saw blade) has resulted in a typical minimum "kerf" width of 0.032" creating the problems of point loading, wear, play, stress, cocking and damage as described or alluded to by Lyon. A further result of the existence of the prior art kerf width was a desire in the prior art to loosely tolerance the fit of the retainer ring set to the inner case diameter and the outer shank diameter since the "play" allowed by the kerf width could cause binding and galling of these surfaces. Additionally, the significant kerf width and loose tolerances caused the prior art retainer rings to offer less resistance to lateral displacement of the sliding shank resulting in non-productive and eventually destructive vibration.

What is needed or desired is a retaining ring for downhole tools which, though split for the purposes of tool assembly, acts when assembled as a solid (or near solid, monolithic, or unitized) ring, tightly yet slidably engaged with the inner case diameter and the outer shank diameter.

BRIEF DESCRIPTION OF THE DRAWINGS

The foregoing and other features and aspects of the invention are best understood with reference to the following description of certain exemplary embodiments, when read in conjunction with the accompanying drawings, wherein.

The drawings illustrate only exemplary embodiments of the invention and are therefore not to be considered limiting of its scope, as the invention may admit to other equally effective embodiments.

BRIEF DESCRIPTION OF EXEMPLARY EMBODIMENTS

The present invention is directed to an apparatus for retaining a drill bit and/or other components within a drill casing during a failure and guiding the lower component or the drill bit during drilling and to one or more methods of manufacturing the apparatus. Although the description of exemplary embodiments is provided below in conjunction with a downhole percussion tool, alternate exemplary embodiments of the invention are applicable to other types of downhole tools including, but not limited to, downhole impact hammers, shock subs, downhole motors, downhole turbines, downhole torque and stall control tools, or any downhole drilling tool that benefits using a retainer ring to provide a retention mechanism in the case of a breakage or failure of the lower components or housing of the tool.

Figure 1A:
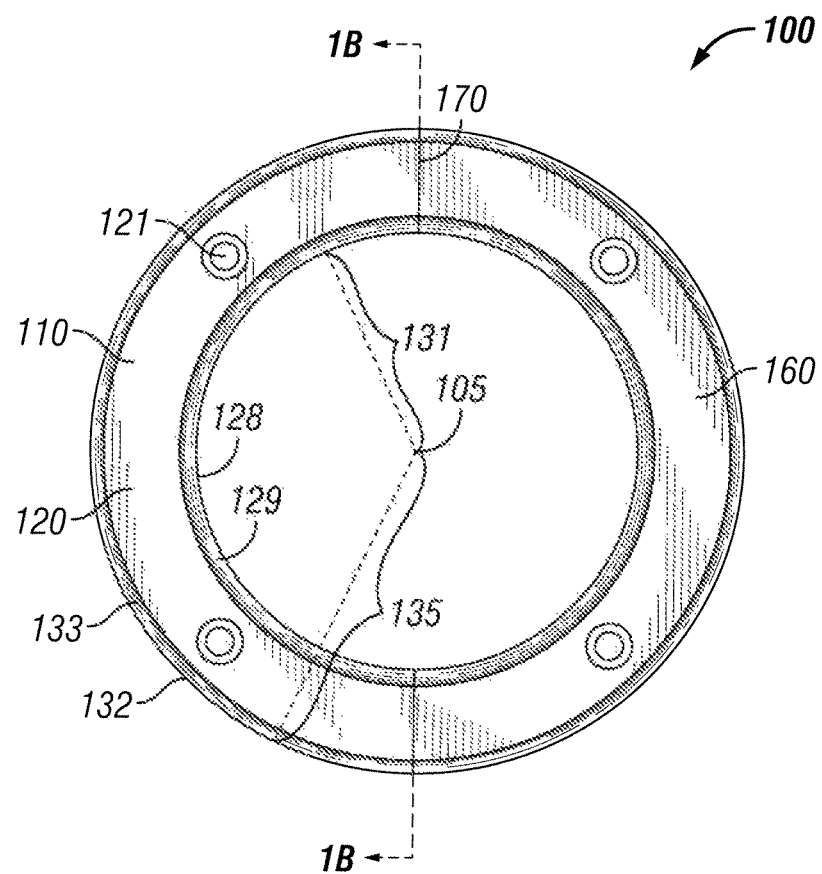
FIG. 1A is a top view of a split retainer and guide ring in accordance with an exemplary embodiment of the invention.
Figure 1B:
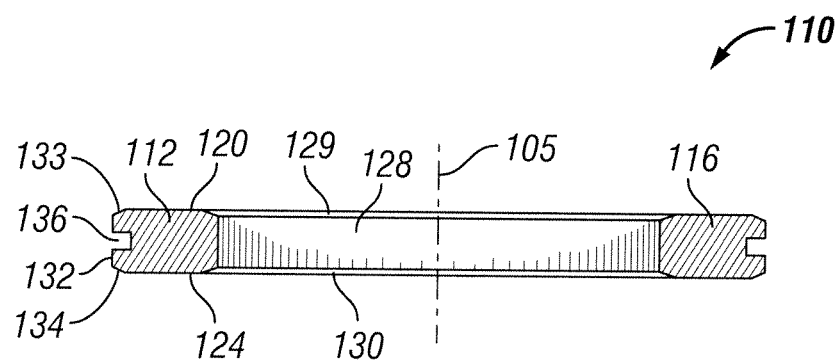
FIG. 1B is a cross-sectional view of the split retainer and guide ring of FIG. 1A in accordance with an exemplary embodiment of the invention.

The invention is better understood by reading the following description of non-limiting, exemplary embodiments with reference to the attached drawings, wherein like parts of each of the figures are identified by like reference characters, and which are briefly described as follows. FIGS. 1A and 1B show various views of a split retainer and guide ring 100 in accordance with an exemplary embodiment of the invention. Referring to FIGS. 1A and 1B, the split retainer and guide ring 100 is an annular ring formed about a central axis 105 and includes a first ring half 110 and a second ring half 160. The first ring half 110 and the second ring half 160 are substantially similar and therefore a description with respect to only the first ring half 110 suffices for the description of both first and second ring halves 110, 160. The split retainer and guide ring 100 is fabricated using mild steel; however other suitable materials including, but not limited to, high strength alloy and other materials hard enough to retain the components of the tool when raised to the surface and strong enough so that the material does not shatter when experiencing an impact blow exerted from a piston.

The first ring half 110 is semi-circular in shape and extends from a first end 112 to a second end 116. The first ring half 110 includes a top surface 120, a bottom surface 124, an internal surface 128, and an external surface 132. According to some exemplary embodiments, the first end 112 is positioned in substantially the same plane as the positioning of the second end 116; however, in other exemplary embodiments, the first end 112 is positioned in a different plane than the positioning of the second end 116. For example, in the exemplary embodiments where the first end 112 is positioned in a different plane than the second end 116, the first ring half 110 has a shorter or longer arcuate length than the second ring half 160, yet still collectively form the ring-shaped split retainer and guide ring 100 when placed adjacently to the second ring half 160.

The top surface 120 is substantially planar in certain exemplary embodiments; however, the top surface 120 is non-planar in other exemplary embodiments. The top surface 120 is oriented in a plane that is substantially perpendicular to the central axis 105. Similarly, the bottom surface 124 is substantially planar in certain exemplary embodiments, while in other exemplary embodiments, the bottom surface 124 is non-planar. The bottom surface 124 also is oriented in a plane that is substantially perpendicular to the central axis 105 and is positioned elevationally lower than the top surface 120. According to certain exemplary embodiments, the top surface 120 and the bottom surface 124 are substantially parallel to one another; however, the top surface 120 and the bottom surface 124 are not parallel to one another in other exemplary embodiments. According to one exemplary embodiment, the distance between the top surface 120 and the bottom surface 124 ranges from about 0.730 inches to about 0.735 inches; however, this dimension is different in other exemplary embodiments. In some exemplary embodiments, one or more of the top surface 120 and the bottom surface 124 includes one or more openings 121 formed therein. According to some exemplary embodiments, the openings 121 extend from the one of the top surface 120 and the bottom surface 124 to the other of the top surface 120 and the bottom surface 124. In another exemplary embodiment, the openings 121 extend from the one of the top surface 120 and the bottom surface 124 toward, but not extending to, the other of the top surface 120 and the bottom surface 124. There are four openings 121 radially and equidistantly spaced apart along the top surface 120; however, there are more or less openings spaced either, radially and equidistantly or radially and non-equidistantly in other exemplary embodiments.

The internal surface 128 is a radial surface that extends substantially from the first end 112 to the second end 116. The internal surface 128 also extends substantially from the bottom surface 124 to substantially the top surface 120. In certain exemplary embodiments, the internal surface 128 is coupled to an upper internal chamfered surface 129, which is coupled to an internal edge of the top surface 120. Similarly, in certain exemplary embodiments, the internal surface 128 is coupled to a lower internal chamfered surface 130, which is coupled to an internal edge of the bottom surface 124. According to some exemplary embodiments, the upper internal chamfered surface 129 and the lower internal chamfered surface 130 are formed at about a forty-five degree angle with respect to the top surface 120 and the bottom surface 124, respectively; however, this angle is larger or smaller in other exemplary embodiments. Alternatively, in other exemplary embodiments, the internal surface 128 is coupled directly to one or more of the top surface 120 and/or the bottom surface 124 or is coupled indirectly to one or more of the top surface 120 and/or the bottom surface 124 using other surface types, in lieu of, or in addition to, chamfered surfaces. The internal surface 128 has an arcuate shape that is defined by a first radius 131 measured from the central axis 105. According to one exemplary embodiment, the first radius 131 ranges from about 2.533 inches to about 2.535 inches; however, this dimension is different in other exemplary embodiments. According to some exemplary embodiments, the internal surface 128 is surface treated.

The external surface 132 is a radial surface that extends substantially from the first end 112 to the second end 116. The external surface 132 also extends substantially from the bottom surface 124 to substantially the top surface 120. In certain exemplary embodiments, the external surface 132 is coupled to an upper external chamfered surface 133, which is coupled to an external edge of the top surface 120. Similarly, in certain exemplary embodiments, the external surface 132 is coupled to a lower external chamfered surface 134, which is coupled to an external edge of the bottom surface 124. According to some exemplary embodiments, the upper external chamfered surface 133 and the lower external chamfered surface 134 are formed at about a forty-five degree angle with respect to the top surface 120 and the bottom surface 124, respectively; however, this angle is larger or smaller in other exemplary embodiments. Alternatively, in other exemplary embodiments, the external surface 132 is coupled directly to one or more of the top surface 120 and/or the bottom surface 124 or is coupled indirectly to one or more of the top surface 120 and/or the bottom surface 124 using other surface types, in lieu of, or in addition to, chamfered surfaces. The external surface 132 has an arcuate shape that is defined by a second radius 135 measured from the central axis 105. According to one exemplary embodiment, the second radius 135 ranges from about 3.346 inches to about 3.348 inches; however, this dimension is different in other exemplary embodiments. The second radius 135 is greater than the first radius 131. According to certain exemplary embodiments, a groove 136 is circumferentially formed within the external surface 132 and extends from the first end 112 to the second end 116. This groove 136 is used for installing the split retainer and guide ring 100 to a drilling assembly according to certain methods, which are described in further detail below. However, other methods can be used which do not utilize the groove 136 and hence the groove 136 is not formed within the external surface 132.

The first ring half 110 and the second ring half 160 are formed such that when the first end 112 of the first ring half 110 is placed adjacent to the first end 112 of the second ring half 160 and the second end 116 of the first ring half 110 is placed adjacent to the second end 116 of the second ring half 160, the split retainer and guide ring 100 is formed. A kerf 170 is formed between the first end 112 of the first ring half 110 and the first end 112 of the second ring half 160 and also formed between the second end 116 of the first ring half 110 and the second end 116 of the second ring half 160. The kerf 170 represents the amount of arc distance that is present between the ring halves 110, 160 when the ring halves 110, 160 are oriented next to one another to form a circular shape. According to some exemplary embodiments, the kerf 170 is 0.000 inches. Thus, when the first end 112 of the first ring half 110 is placed adjacently to and touching the first end 112 of the second ring half 160 and the second end 116 of the first ring half 110 is placed adjacently to and touching the second end 116 of the second ring half 160, the first and second ring halves 110, 160 form a complete and continuous circular ring. In another exemplary embodiment, the kerf 170 ranges from about 0.001 inches to about 0.002 inches. In yet another exemplary embodiment, the kerf 170 ranges from about 0.001 inches to about 0.005 inches. In another exemplary embodiment, the kerf 170 ranges from about 0.001 inches to about 0.010 inches.

Figure 2:
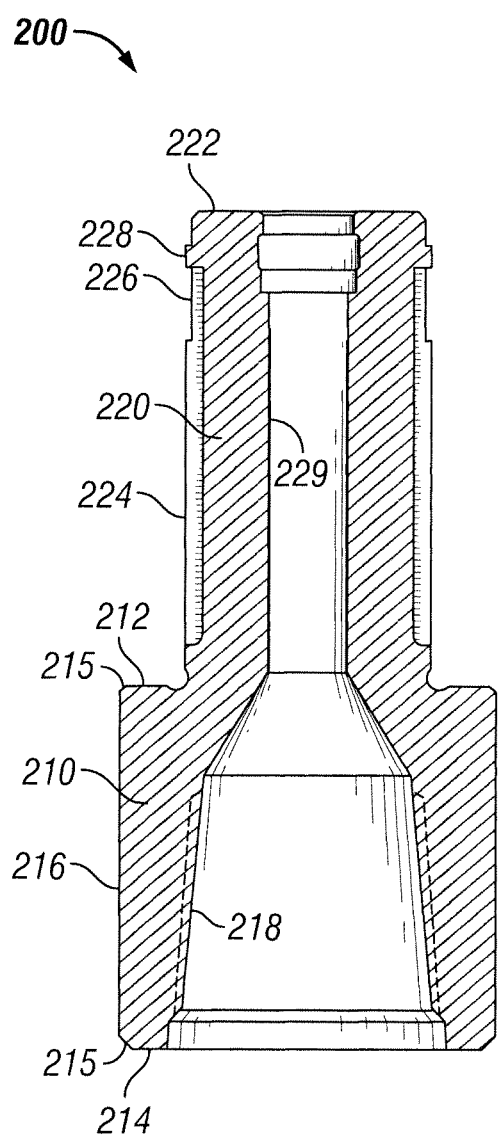
FIG. 2 is a cross-sectional view of a box mandrel to which the split retainer ring of FIG. 1A is to be coupled around in accordance with an exemplary embodiment of the invention.

FIG. 2 is a cross-sectional view of a box mandrel 200 to which the split retainer ring 100 (FIG. 1A) is to be coupled around in accordance with an exemplary embodiment of the invention. The box mandrel 200 includes an enlarged diameter end part 210 and a shank 220 extending outwardly and vertically from the enlarged diameter end part 210.

The enlarged diameter end part 210 is integrally formed with the shank 220 and includes a top surface 212, a bottom surface 214, an external surface 216, and a bore 218 extending from the bottom surface 214 to the top surface 212. The top surface 212 is substantially planar; however, the top surface 212 is non-planar in other exemplary embodiments. Similarly, the bottom surface 214 is substantially planar; however, the bottom surface 214 is non-planar in other exemplary embodiments. The external surface 216 extends substantially from the outer edges of the bottom surface 214 to the outer edges of the top surface 212. In certain exemplary embodiments, the external surface 216 is coupled to one or more of the top surface 212 and the bottom surface 214 using a chamfered corner 215. The bore 218 is tapered and threaded in certain exemplary embodiments; however, the bore 218 is shaped in a different form in alternative exemplary embodiments. The bore 218 is configured to receive a bit (not shown), such as a claw bit, from the bottom surface 214. According to certain exemplary embodiments, the enlarged diameter end part 210 has an outer diameter of about 8.00 inches and a height of about 8.000 inches. The tapered bore 218 is dimensioned to about 6⅝ API. These dimensions are different in some other exemplary embodiments pursuant to designer choices and bit sizes to be used.

The shank 220 extends outwardly from the top surface 212 of the enlarged diameter end part 210. According to one exemplary embodiment, the length of the shank 220 is about 10.375 inches; however, this length is larger or smaller in other exemplary embodiments. The shank 220 is cylindrically shaped and includes a top surface 222, one or more longitudinal grooves 224, an undercut portion 226, a shoulder 228, and a passageway 229. Although the shank 220 is cylindrically shaped in some exemplary embodiments, the shank 220 is shaped differently in other exemplary embodiments.

The top surface 222 of the shank 220 is cylindrically shaped and is substantially planar in certain exemplary embodiments. The top surface 222 receives impact blows from a piston, for example, according to certain exemplary embodiments. The diameter of the top surface 222 is about 5.062 inches; however, this dimension is different in other exemplary embodiments.

Longitudinal grooves 224 are formed longitudinally along a portion of the shank 220 and extends substantially from the lower portion of the shank 220 towards the undercut portion 226. These longitudinal groves 224 are formed to have a diameter ranging from about 5.185 inches to about 5.187 inches; however, this dimension is different in other exemplary embodiments. The length of the longitudinal grooves 224 is about 6.000 inches in some exemplary embodiments, but again, is different in other exemplary embodiments. There are eight longitudinal grooves 224 formed circumferentially about the shank 220; however, there are greater or fewer longitudinal grooves 224 formed in other exemplary embodiments without departing from the scope and spirit of the present exemplary embodiments. Additionally, these longitudinal grooves 224 are spaced equidistantly around the shank according to some exemplary embodiments. These longitudinal grooves 224 are used for inserting drive lugs 350 (FIG. 3) according to certain exemplary embodiments.

The undercut portion 226 is formed elevationally above and adjacent to the longitudinal grooves 224. This undercut portion 226 has a smaller diameter than the diameter of the longitudinal grooves 224. According to certain exemplary embodiments, the diameter of the undercut portion 226 ranges from about 5.060 inches to about 5.062 inches, but is different in some other exemplary embodiments. The length of the undercut portion 226 is about 2.250 inches in some exemplary embodiments. At least a portion of the undercut portion 226 is designed to be surrounded by the internal surface 128 (FIG. 1A) of the split retainer and guide ring 100 (FIG. 1A). The split retainer and guide ring 100 (FIG. 1A), as previously mentioned, has an internal diameter, which is twice the first radius 131 (FIG. 1A), of about 5.067 inches to about 5.069 inches. Thus, since the diameter of the longitudinal grooves 224 is larger than the diameter of the internal surface 128 of the split retainer and guide ring 100 (FIG. 1A), the longitudinal grooves 224 ensures that the split retainer and guide ring 100 (FIG. 1A) remains above the top portions of the longitudinal grooves 224. Also, as previously mentioned, the split retainer and guide ring 100 (FIG. 1A) has a height, or thickness, of about 0.730 inches to about 0.735 inches. Thus, the split retainer and guide ring 100 (FIG. 1A), once fitted around the undercut portion 226, is designed to vertically slide along the length of the undercut portion 226, which is about 2.250 inches in certain exemplary embodiments.

The shoulder 228 is formed above and adjacently to the undercut portion 226 by the formation of the undercut portion 226. The shoulder 228 has a diameter similar to that of the longitudinal grooves 224; however, the diameter is greater or smaller than the diameter of the longitudinal grooves 224 in other exemplary embodiments as long as the diameter of the shoulder 228 is greater than the diameter of the undercut portion 226. Thus, since the diameter of the shoulder 228 is larger than the diameter of the internal surface 128 (FIG. 1A) of the split retainer and guide ring 100 (FIG. 1A), the shoulder 228 ensures that the split retainer and guide ring 100 (FIG. 1A) remains below the bottom portions of the shoulder 228 once the split retainer and guide ring 100 (FIG. 1A) has been coupled around the undercut portion 226. In some exemplary embodiments, the height of the shoulder 228 is about 0.5 inches; however, this height is different in other exemplary embodiments so long as the shoulder 228 is durable to withstand impact loads exerted on the top surface 222.

The passageway 229 is formed within the shank 220 and extends from the top surface 222 to the bottom of the shank 220, thereby being in communication with the bore 218. The passageway 229 supplies fluid (not shown) from a fluid supply source (not shown), typically located at the surface of the wellbore, to the bit (not shown) so as to remove cuttings from the wellbore. According to some exemplary embodiments, the passageway 229 has a diameter of 1.75 inches; however, this diameter is different in other exemplary embodiments.

Figure 3:
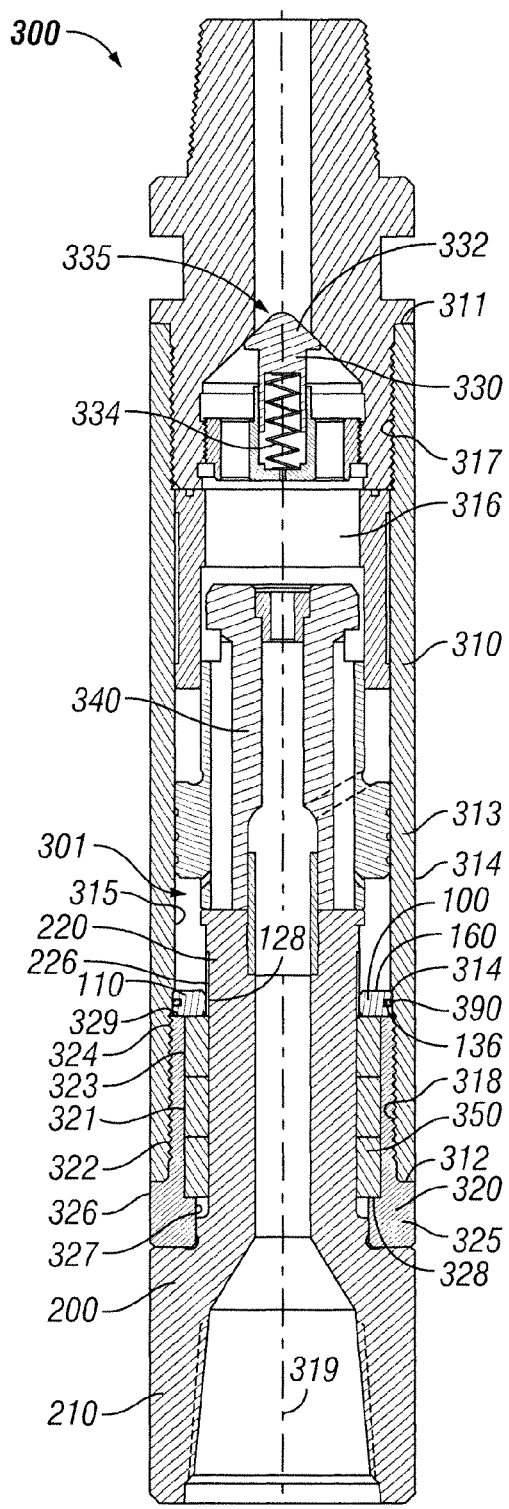
FIG. 3 is a cross-sectional view of the lower end of a rock drill assembly during normal drilling operations with the split retainer and guide ring of FIG. 1A installed therein in accordance with an exemplary embodiment of the invention.

FIG. 3 is a cross-sectional view of the lower end of a rock drill assembly 300 during normal drilling operations with the split retainer and guide ring 100 installed therein in accordance with an exemplary embodiment of the invention. The rock drill assembly 300 includes a casing 310, a driver sub 320, a valve assembly 330, a piston 340, the box mandrel 200, the split retainer and guide ring 100, and one or more drive lugs 350.

The casing 310 is cylindrically shaped and includes a top surface 311, a bottom surface 312, a sidewall 313, and a channel 316. The top surface 311 is substantially planar in some exemplary embodiments, but is non-planar in other exemplary embodiments. Similarly, the bottom surface 312 is substantially planar in some exemplary embodiments, but is non-planar in other exemplary embodiments. The sidewall 313 includes an external surface 314 and an internal surface 315, which both extend from the top surface 311 to the bottom surface 312. The channel 316 extends longitudinally along the length of the casing 310 and is surrounded by the internal surface 315. The channel 316 extends from the top surface 311 of the casing 310 to the bottom surface 312 of the casing 310. The casing 310 is fabricated using a metal, metal alloy, or other material known to people having ordinary skill in the art. According to certain exemplary embodiments, the casing 310 also includes upper threads 317 extending substantially from the top surface 311 towards the bottom surface 312 along the internal surface 315 and lower threads 318 extending substantially from the bottom surface 312 towards the top surface 311 along the internal surface 315. One or more of the upper threads 317 and the lower threads 318 extend along the external surface 314, in lieu of the internal surface 315, according to alternative exemplary embodiments. According to some exemplary embodiments, the casing 310 is rotated about a central axis 319 by conventional drive means (not shown).

The driver sub 320 includes an upper portion 321 and a lower portion 325. The upper portion 321 is cylindrically shaped, according to some exemplary embodiments, and includes an external surface 322 and an internal surface 323. The external surface 322 includes upper mating threads 324 substantially along the entire length of the external surface 322, according to some exemplary embodiments. These upper mating threads 324 are coupled to the lower threads 318, which form an upper notch 329 where the top portion of the upper mating threads 324 and a portion of the casing 310 substantially meet one another. Thus, the upper portion 321 is inserted within the lower portion of the casing 310 according to certain exemplary embodiments. The lower portion 325 also is cylindrically shaped, according to some exemplary embodiments, and includes an external surface 326 and an internal surface 327. The lower portion's external surface 326 has a diameter that is greater than the diameter of the upper portion's external surface 322 and is configured to form an extension of the casing 310 once the driver sub 320 is coupled to the casing 310. The lower portion's internal surface 327 has a diameter that is smaller than the diameter of the upper portion's internal surface 323 and is configured to form a lower notch 328 where the lower portion's internal surface 327 and the upper portion's internal surface 323 substantially meet one another. According to certain exemplary embodiments, the driver sub 320 is fixedly coupled to the casing 310 and rotates with the casing 310.

The valve assembly 330 is communicably coupled to the channel 316 and is disposed within the top portion of the casing 310, according to some exemplary embodiments, or is disposed adjacent the top portion of the casing 310, according to other exemplary embodiments. The structure and operation of the valve assembly 330 is known to people having ordinary skill in the art and therefore is not described in detail for the sake of brevity. The valve assembly 330 controls compressed air used to operate the piston 340, which is discussed in further detail below. The valve assembly 330 includes a check valve 332 and a biasing spring 334 positioned elevationally below and adjacent to the check valve 332 and biasing the check valve 332 in a closed position 335, as shown in FIG. 3. Compressed air from a source (not shown) is communicated into a portion of the channel 316 located between the valve assembly 330 and the piston 340 through the check valve assembly 332. The check valve 332 moves to an open position 435 (FIG. 4) when air pressure immediately above the check valve 332 exceeds the air pressure in the portion of the channel 316 located between the valve assembly 330 and the piston 340 and the biasing force applied to the check valve 332 by the biasing spring 334. Although one example of the valve assembly 330 has been described, other types of valve assemblies that control movement of the piston 340 are used in other exemplary embodiments. Also, other mechanisms known to people having ordinary skill in the art can be used to operate the piston 340 in lieu of the valve assembly 330 and/or the compressed air. For example, instead of using compressed air to drive the piston 340, other fluid types can be used to drive the piston 340 in other exemplary embodiments.

The piston 340 is disposed within the channel 316 below the valve assembly 330. The shape and fabrication of the piston 340 is known to people having ordinary skill in the art and will not be discussed in detail for the sake of brevity. The piston 340 moves axially within the channel 316 in a direction that is parallel to the central axis 319. When the pressure in the portion of the channel 316 located between the valve assembly 330 and the top of the piston 340 increases, the piston 340 moves in an axially downward direction towards the top surface 222 of the box mandrel 200, thereby making contact with the top surface 222 of the box mandrel 200 and pushing the box mandrel 200 in a downward direction. Conversely, when the pressure in the portion of the channel 316 located between the valve assembly 330 and the top of the piston 340 decreases, the piston 340 moves in an axially upward direction away from the top surface 222 of the box mandrel 200, thereby allowing the box mandrel 200 to be moved in an upward direction. Venting paths (not shown) are formed at least along the piston 340 and the casing 310, which are used in operation of the piston 340.

The box mandrel 200 has been previously described and is not repeated for the sake of brevity. The shank 220 is inserted into the bottom portion of the channel 316 such that the enlarged diameter end part 210 remains outside and adjacent to the lower portions of both the casing 310 and the driver sub 320. The top surface 222 of the shank 220 is positioned near the lower portion of the piston 340 and makes contact with the piston 340 during operation of the piston 340. The external surface 216 of the enlarged diameter end part 210 is aligned with the external surfaces 314, 322 of both the casing 310 and the driver sub 320, according to certain exemplary embodiments. The box mandrel 200 is axially movable in a downward direction when the piston 340 strikes the top surface 222 of the box mandrel 200 and is axially movable in an upward direction when the bit (not shown) make contact with the bottom of the wellbore (not shown).

The split retainer and guide ring 100 has been previously described and is not repeated for the sake of brevity. As previously mentioned, the split retainer and guide ring 100 is positioned around a portion of the shank 220 within the undercut portion 226. The split retainer and guide ring 100 is fixedly coupled to the casing 310 within the upper notch 329 adjacently above the upper portion 321 of the driver sub 320. As seen in FIG. 3, an elastic ring 390 is coupled circumferentially around the split retainer and guide ring 100 within the groove 136. This elastic ring 390 is only used for installing the split retainer and guide ring 100 around the undercut portion 226 during insertion of the shank 220 within the casing 310. However, other methods for maintaining the split retainer and guide ring 100 around the undercut portion 226 while the shank 220 is inserted into the casing 310 is used in other exemplary embodiments. In one example, one or more springs (not shown) are used to maintain the structure of the split retainer and guide ring 100 while the shank 220 is inserted into the casing 310. In another example, a metal band (not shown) is used to maintain the structure of the split retainer and guide ring 100 while the shank 220 is inserted into the casing 310. In yet another example, each ring half 110, 160 is magnetized to maintain the structure of the split retainer and guide ring 100 while the shank 220 is inserted into the casing 310. The first end 112 (FIG. 1B) of the first ring half 110 is magnetically attracted to the first end 112 (FIG. 1B) of the second ring half 160. similarly, the second end 116 (FIG. 1B) of the first ring half 110 is magnetically attracted to the second end 116 (FIG. 1B) of the second ring half 160. In a further example, an adhesive (not shown) is placed on the first end 112 (FIG. 1B) and/or the second end 116 (FIG. 1B) of each of the first ring half 110 and the second ring half 160 and used to maintain the structure of the split retainer and guide ring 100 when the shank 220 is inserted into the casing 310. The split retainer and guide ring 100 remains stationary within the casing 310 and allows the undercut portion 226 of the shank 220 to axially move along the internal surface 128 of the split retainer and guide ring 100. As previously mentioned, this shank 220 is axially moved by operation of the piston 340 and/or the bit contacting the bottom of the wellbore.

Drive lugs 350 are known to people having ordinary skill in the art and will not be described in detail herein. These drive lugs 350 are typically fabricated using brass or any other suitable material. Although three drive lugs 350 are illustrated, greater or fewer drive lugs 350 are used in other exemplary embodiments. The drive lugs are inserted between the longitudinal groves 224 (FIG. 2) and contact portions of the shank 220 and portions of the driver sub's internal surface 323. According to certain exemplary embodiments, one or more drive lugs 350 are positioned adjacently below the split retainer and guide ring 100 and extend to the lower notch 328.

In FIG. 3, the piston 340 is positioned at an intermediate position 301 where the piston 340 is contacting the top surface 222 of the shank 220 while the enlarged diameter end part 210 is still contacting the driver sub 320. During drilling, the intermediate position 301 shown in FIG. 3 occurs toward the end of the downstroke of the piston 340, i.e. when the piston 340 is being driven against the drill bit, and also at the beginning of an upstroke of the piston 340, i.e., when the piston 340 is being raised to a position where the piston 340 is not contacting the top surface 222 of the shank 220.

Figure 4:
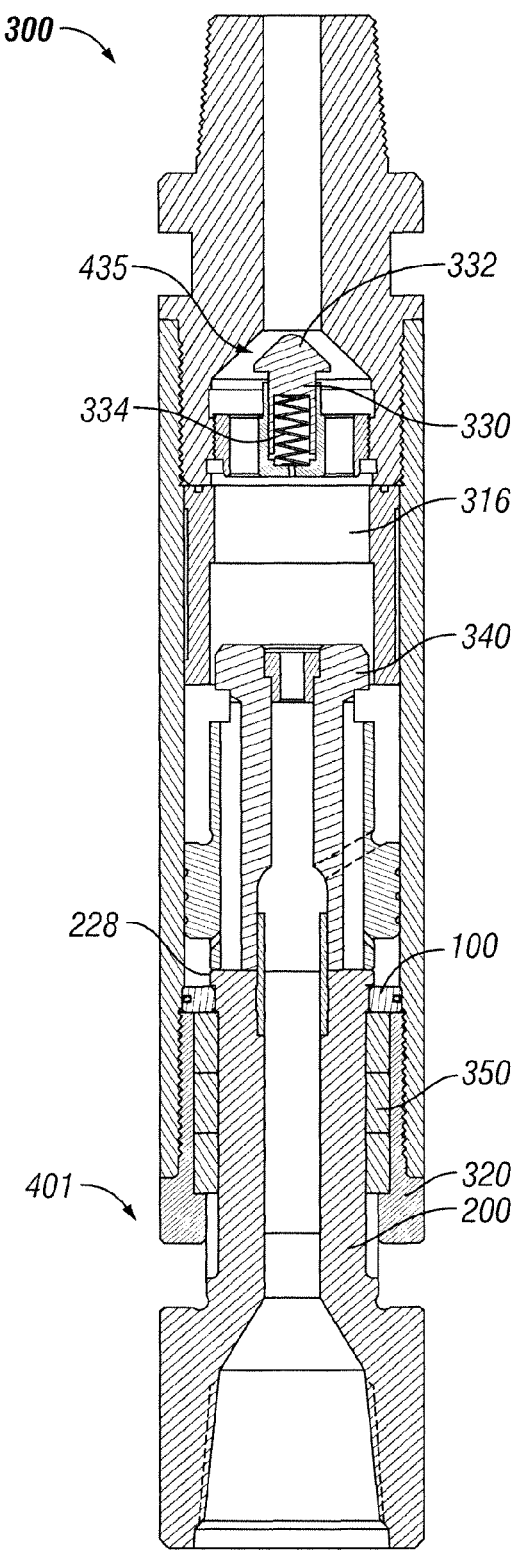
FIG. 4 is a cross-sectional view of the lower end of the rock drill assembly when the drill bit has been driven towards a "drop open" position and the shoulder of the box mandrel engages the split retainer and guide ring of FIG. 1A in accordance with an exemplary embodiment of the invention.

On each downward stroke of the piston 340, the piston 340 impacts the box mandrel 200. When the piston 340 impacts the box mandrel 200, the box mandrel 200 is driven downward into the rock, or other strata, being drilled. The split retainer and guide ring 100 is in communication with the box mandrel's shank 220 through only the split retainer and guide ring's internal surface 128. The split retainer and guide ring 100, with its minimal to no kerf 170 (FIG. 1A) as described above, acts as a guide for the shank 220, thereby preventing cocking or lateral vibrations in the shank 220. Under normal drilling conditions, the rock absorbs most of the energy of drilling, and the box mandrel 200 is driven downward only a short distance into the rock. However, under certain circumstances, such as when the rock is weak or unconsolidated, or if poor drilling practices are used, the box mandrel 200 is driven to its "drop-open" position 401, which is illustrated in FIG. 4. FIG. 4 is a cross-sectional view of the lower end of the rock drill assembly 300 when the drill bit has been driven towards the "drop open" position 401 and the shoulder 228 of the box mandrel 200 engages the split retainer and guide ring 100 in accordance with an exemplary embodiment of the invention. In such an event, the split retainer and guide ring 100 prevents the box mandrel 200, and also the drill bit coupled to the box mandrel 200, to be driven out of the casing 100. In these conditions, the split retainer and guide ring 100 acts as a retainer for preventing one or more components of the rock drill assembly from being lost, even during certain failure conditions.

In one tool failure example, according to one of the exemplary embodiments depicted in FIGS. 3 and 4, if a fatigue failure occurred circumferentially in the threading or cross-section of the driver sub 320, the drive lugs 350 and a lower portion of the driver sub 320 would drop into the hole. However, the box mandrel 200 would shoulder on the split retainer and guide ring 100, thereby retaining the box mandrel 200 in the tool and preventing piston 340, box mandrel 200, and drill bit loss into the hole. In another tool failure example, if a shearing of the box mandrel 200 occurs, a portion of the box mandrel 200 below the shearing failure and the bit would be lost in the hole. However, the driver sub 320 and the piston 340 would be retained within the rock drill assembly 300.

In summary, in addition to the split retaining and guide ring 100 performing a retaining function for one or more components of the rock drill assembly 300, the split retaining and guide ring 100 also provides for a rigid, tightly toleranced guide ring to assist in limiting lateral displacement of the rock drill assembly's travelling shank 220. Hence, the wear, the stress, and/or the point loading on the longitudinal grooves 224 (FIG. 2), the drive lugs 350, or shank 220 is limited.

Figure 5A:
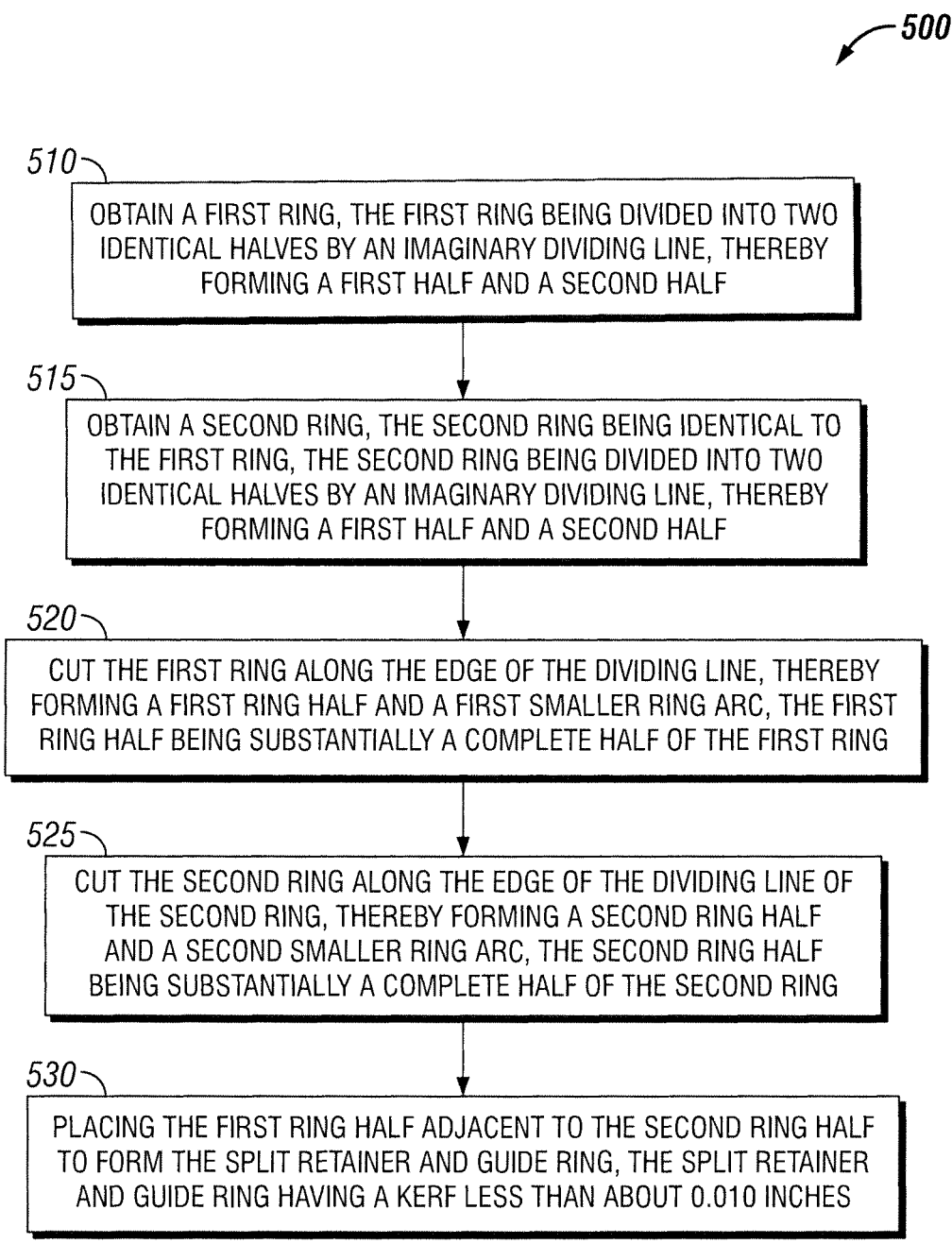
FIG. 5A illustrates a method for forming the split retainer and guide ring of FIG. 1A in accordance with one exemplary embodiment of the present invention.
Figure 5B:
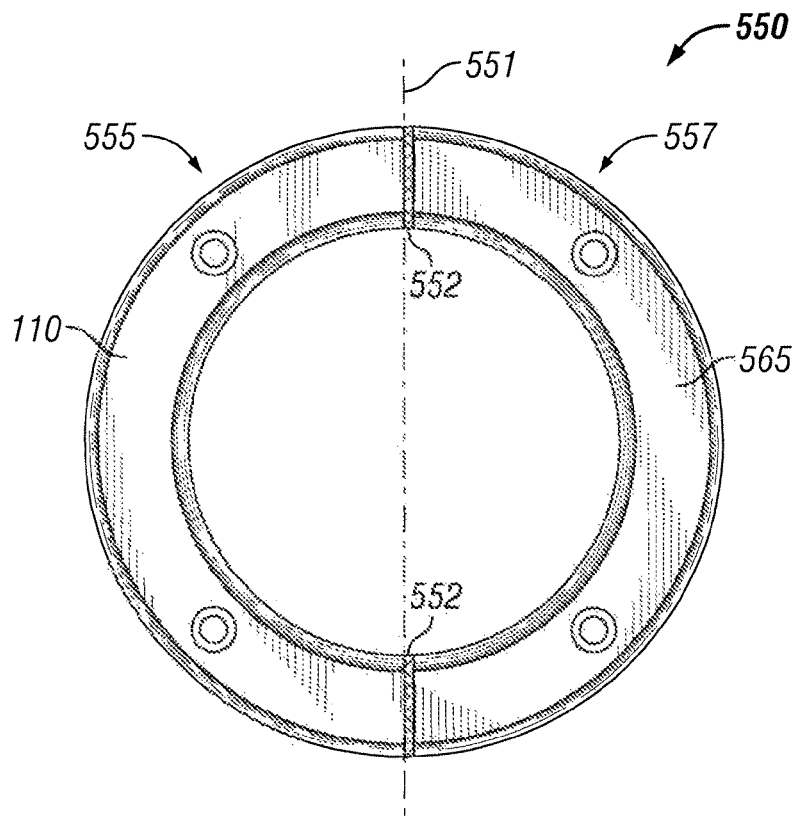
FIG. 5B is a top view of a first ring that is used in forming the split retainer and guide ring of FIG. 1A according to the method of FIG. 5A.

FIG. 5A illustrates a method 500 for forming the split retainer and guide ring 100 (FIG. 1A) in accordance with one exemplary embodiment of the present invention. FIG. 5B is a top view of a first ring 550 that is used in forming the split retainer and guide ring 100 (FIG. 1A) according to the method 500 of FIG. 5A. Referring to FIGS. 5A and 5B, the method 500 includes step 510. In step 510, a first ring 550 is obtained. The first ring 550 is fabricated using the same material used to fabricate the split retainer and guide ring 100 (FIG. 1A). The first ring 550 is divided into two identical halves, a first half 555 and a second half 557, by an imaginary dividing line 551 extending through a diameter of the first ring 550.

The method 500 also includes step 515. In step 515, a second ring is obtained. The second ring is substantially identical to the first ring 550, and therefore is not depicted in a duplicative illustration and any description provided for the first ring 550 also is applicable to the description of the second ring. The second ring also is fabricated using the same material used to fabricate the split retainer and guide ring 100 (FIG. 1A). The second ring is divided into two identical halves, a first half and a second half, by an imaginary dividing line extending through a diameter of the second ring, which is similar as the first ring 550.

The method 500 also includes step 520. In step 520, the first ring 550 is cut along the edge of the imaginary dividing line 551, thereby removing material 552 from the first ring 550 during the cut and resulting in the first ring half 110, which is also referred to as a first larger ring arc, and a first smaller ring arc 565. The first ring half 110 is substantially a complete half of the first ring 550, while the first smaller ring arc 565 is less than a complete half of the first ring 550. The first ring half 110 is retained, while the first smaller ring arc 565 is discarded according to some exemplary embodiments. The first ring half 110 is used to form the split retainer and guide ring 100 (FIG. 1A).

The method 500 also includes step 525. In step 525, the second ring is cut along the edge of the imaginary dividing line, thereby removing material from the second ring during the cut and resulting in a second ring half 160 (FIG. 1A), which is also referred to as a second larger ring arc, and a second smaller ring arc. The second ring half 160 (FIG. 1A) is substantially a complete half of the second ring, while the second smaller ring arc is less than a complete half of the second ring. The second ring half is retained, while the second smaller ring arc is discarded according to some exemplary embodiments. The second ring half 160 (FIG. 1A) is also used to form the split retainer and guide ring 100 (FIG. 1A).

The method 500 also includes step 530. In step 530, the first ring half 110 is placed adjacent to the second ring half 160 (FIG. 1A) to form the split retainer and guide ring 100 (FIG. 1A). The split retainer and guide ring 100 (FIG. 1A) is a single "perfect" ring, which has a very small kerf 170 (FIG. 1A) or no kerf 170 (FIG. 1A). The kerf 170 (FIG. 1A) between the two larger ring arcs, or between the first ring half 110 and the second ring half 160 (FIG. 1A), is less than 0.010 inches in some exemplary embodiments. In other exemplary embodiments, the kerf 170 (FIG. 1A) is less than 0.005 inches. In yet other exemplary embodiments, the kerf 170 (FIG. 1A) is less than 0.002 inches. According to some exemplary embodiments, the cutting of the first ring 550 and the second ring is performed by saw cutting. Alternatively, other machining methods for providing a minimum kerf 170 (FIG. 1A) is used in other exemplary embodiments. Some examples of these other machining methods include, but are not limited to, ion machining, laser cutting, and wire electro discharge machining ("wire EDM").

Figure 6:
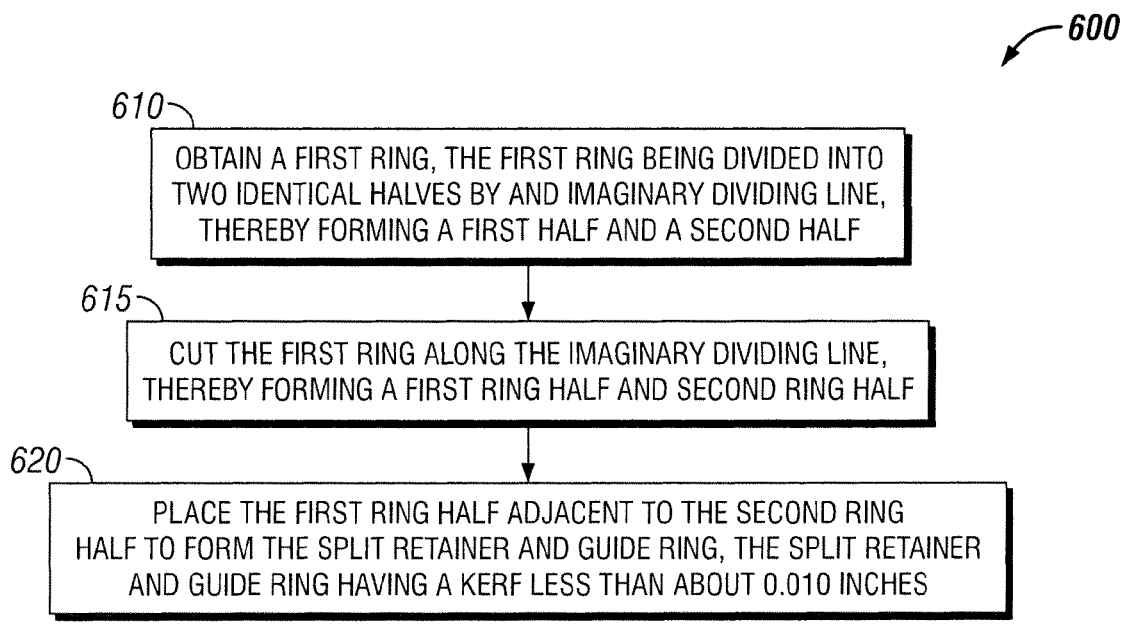
FIG. 6 illustrates a method for forming the split retainer and guide ring of FIG. 1A in accordance with another exemplary embodiment of the present invention.

FIG. 6 illustrates a method 600 for forming the split retainer and guide ring 100 (FIG. 1A) in accordance with another exemplary embodiment of the present invention. Referring to FIG. 6, the method 600 includes step 610. In step 610, a first ring is obtained. The first ring is fabricated using the same material used to fabricate the split retainer and guide ring 100 (FIG. 1A). The first ring is divided into two identical halves, a first half and a second half, by an imaginary dividing line extending through a diameter of the first ring.

The method 600 also includes step 615. In step 615, the first ring is cut along the imaginary dividing line, thereby forming a first ring half and a second ring half. The method 600 also includes step 620. In step 620, the first ring half 110 (FIG. 1A) is placed adjacent to the second ring half 160 (FIG. 1A) to form the split retainer and guide ring 100 (FIG. 1A). The split retainer and guide ring 100 (FIG. 1A) is a single "perfect" ring, which has a very small kerf 170 (FIG. 1A) or no kerf 170 (FIG. 1A). The kerf 170 (FIG. 1A) is less than 0.010 inches in some exemplary embodiments. In other exemplary embodiments, the kerf 170 (FIG. 1A) is less than 0.005 inches. In yet other exemplary embodiments, the kerf 170 (FIG. 1A) is less than 0.002 inches. According to some exemplary embodiments, the cutting of the first ring is performed using an ion machining process. The ion machining process results in the formation of the split retainer and guide ring 100 (FIG. 1A) having the kerf 170 be less than about 0.002 inches. According to yet another exemplary embodiment, the cutting of the first ring is performed using a laser cutting process. The laser cutting process results in the formation of the split retainer and guide ring 100 (FIG. 1A) having the kerf 170 be less than about 0.010 inches. According to yet another exemplary embodiment, the cutting of the first ring is performed using a Wire Electro Discharge Machining ("WEDM") process. The WEDM process results in the formation of the split retainer and guide ring 100 (FIG. 1A) having the kerf 170 be less than about 0.005 inches. In other exemplary embodiments, other machining methods known to people having ordinary skill in the art, having the benefit of the present disclosure, are used to produce the split retainer and guide ring 100 (FIG. 1A) having a kerf 170 of less than 0.010 inches.

According to yet another method for fabricating the split retainer and guide ring 100 (FIG. 1A), two semi-circular pieces of the retainer ring material are clamped into a lathe chuck (not shown). Once clamped into the lathe chuck, a bore is machined through the center portion of the two semi-circular pieces of the retainer ring material. The outer diameter of the two semi-circular pieces of the retainer ring material is turned to form a "perfect" ring, or the split retainer and guide ring 100 (FIG. 1A).

Although each exemplary embodiment has been described in detail, it is to be construed that any features and modifications that are applicable to one embodiment are also applicable to the other embodiments. Furthermore, although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A multi-component downhole tool, comprising:
an upper cylindrical casing having a channel extending through the casing;
a lower component movably coupled to the upper cylindrical casing, the lower component comprising an undercut formed circumferentially around a portion of the upper portion of the lower component; and
a split retainer and guide ring being coupled around the undercut, the split retainer and guide ring comprising a first ring half from a first ring and a second ring half from a second ring,
wherein the first ring and second ring are not the same; and
wherein a kerf is formed between the first ring half and the second ring half, the kerf ranging from about zero inches to about 0.010 inches.

2. The multi-component downhole tool of claim 1, wherein the kerf ranges from about zero inches to about 0.005 inches.

3. The multi-component downhole tool of claim 1, wherein the kerf ranges from about zero inches to about 0.002 inches.

4. The multi-component downhole tool of claim 1, wherein the split retainer and guide ring remains stationary with respect to the casing and is securely coupled around the undercut portion, a portion of the undercut portion continuously maintaining contact with the internal surface of the guide ring as the undercut portion moves axially or rotationally within the casing.

5. The multi-component downhole tool of claim 1, wherein the first ring half is a complete half of the first ring.

6. The multi-component downhole tool of claim 5, wherein the second ring half is a complete half of the second ring.

7. The multi-component downhole tool of claim 6, wherein the first ring half is identical to the second ring half.

8. The multi-component downhole tool of claim 1, wherein the split retainer and guide ring further comprises a top surface and a bottom surface, wherein the top surface is parallel to the bottom surface.

9. The multi-component downhole tool of claim 8, wherein the top surface has holes extending there through.

10. The multi-component downhole tool of claim 9, wherein the holes extend through the bottom surface.

11. The multi-component downhole tool of claim 8, wherein the split retainer and guide ring further comprises an external surface extending between the top surface and bottom surface, the external surface shaped to receive an elastic ring.

12. The multi-component downhole tool of claim 1, wherein the split retainer and guide ring further comprises an elastic ring positioned to secure the first half to the second half.

13. The multi-component downhole tool of claim 1, wherein the kerf is zero inches.

14. The multi-component downhole tool of claim 1, wherein the first ring and the second ring are identical.

15. The multi-component downhole tool of claim 1, wherein the first ring half and the second ring half form a continuous circular ring.

* * * * *